US009528633B2

(12) United States Patent
Dos Santos et al.

(10) Patent No.: US 9,528,633 B2
(45) Date of Patent: Dec. 27, 2016

(54) MEMS CHECK VALVE

(71) Applicant: Novartis AG, Basel (CH)

(72) Inventors: Cesario Pereira Dos Santos, Aliso Viejo, CA (US); Leslie A. Field, Portola Valley, CA (US)

(73) Assignee: Novartis AG, Basel (CH)

( * ) Notice: Subject to any disclaimer, the term of this patent is extended or adjusted under 35 U.S.C. 154(b) by 89 days.

(21) Appl. No.: 14/094,903

(22) Filed: Dec. 3, 2013

(65) Prior Publication Data

US 2014/0166140 A1     Jun. 19, 2014

Related U.S. Application Data

(60) Provisional application No. 61/737,964, filed on Dec. 17, 2012.

(51) Int. Cl.
*F16K 15/14*     (2006.01)
*F16K 99/00*     (2006.01)

(52) U.S. Cl.
CPC ....... *F16K 99/0015* (2013.01); *F16K 99/0057* (2013.01); *F16K 2099/0088* (2013.01); *Y10T 29/49412* (2015.01); *Y10T 137/7895* (2015.04)

(58) Field of Classification Search
CPC .............. F16K 15/147; F16K 99/0015; F16K 2099/0088; Y10T 29/49412; Y10T 137/7895
USPC ................ 137/859, 15.18, 597, 512.15, 852; 251/129.01, 367
See application file for complete search history.

(56) References Cited

U.S. PATENT DOCUMENTS

| 4,089,329 | A |   | 5/1978  | Couvillon, Jr. et al. |
|-----------|---|---|---------|-----------------------|
| 4,182,355 | A | * | 1/1980  | Briel ............ F16K 15/144 |
|           |   |   |         | 137/496 |
| 4,206,762 | A |   | 6/1980  | Cosman |
| 4,457,757 | A |   | 7/1984  | Molteno |
| 4,560,375 | A |   | 12/1985 | Schulte et al. |
| 4,604,087 | A |   | 8/1986  | Joseph |
| 4,656,827 | A |   | 4/1987  | Puillet |

(Continued)

FOREIGN PATENT DOCUMENTS

| CN | 101360523 | 2/2009 |
|----|-----------|--------|
| CN | 101466299 | 6/2009 |

(Continued)

OTHER PUBLICATIONS

International Search Report and Written Opinion issued for PCT/US2013/074113 dated Apr. 18, 2014, 12 pgs.

(Continued)

*Primary Examiner* — Kevin Lee
*Assistant Examiner* — P. Macade Nichols
(74) *Attorney, Agent, or Firm* — Haynes and Boone, LLP

(57) ABSTRACT

A MEMS check valve includes a supporting portion having a first perforation therethrough sized to permit fluid flow and includes a displaceable portion having a second perforation therethrough sized to permit fluid flow. The displaceable portion may be moveable relative to the supporting portion between a closed position inhibiting fluid flow through the valve and an open position permitting fluid flow through the valve. The first and second perforations are offset to inhibit fluid flow when the displaceable portion is in the first position, and fluid may flow through the first and second perforations when the displaceable portion is in the second position.

19 Claims, 4 Drawing Sheets

(56) References Cited

U.S. PATENT DOCUMENTS

| | | | |
|---|---|---|---|
| 4,750,901 A | 6/1988 | Molteno | |
| 4,869,282 A | 9/1989 | Sittler et al. | |
| 4,922,913 A | 5/1990 | Waters, Jr. et al. | |
| 5,005,577 A | 4/1991 | Frenkel | |
| 5,083,742 A | 1/1992 | Wylie et al. | |
| 5,171,132 A | 12/1992 | Miyazaki et al. | |
| 5,178,604 A | 1/1993 | Baerveldt et al. | |
| 5,179,953 A | 1/1993 | Kursar | |
| 5,397,300 A | 3/1995 | Baerveldt et al. | |
| 5,433,701 A | 7/1995 | Rubinstein | |
| 5,466,233 A | 11/1995 | Weiner et al. | |
| 5,476,445 A | 12/1995 | Baerveldt et al. | |
| 5,558,629 A | 9/1996 | Baerveldt et al. | |
| 5,573,646 A | 11/1996 | Saito et al. | |
| 5,626,558 A | 5/1997 | Suson | |
| 5,681,275 A | 10/1997 | Ahmed | |
| 5,702,618 A | 12/1997 | Saaski et al. | |
| 5,707,643 A | 1/1998 | Ogura et al. | |
| 5,722,948 A | 3/1998 | Gross | |
| 5,891,097 A | 4/1999 | Saito et al. | |
| 5,910,110 A | 6/1999 | Bastable | |
| 6,007,511 A | 12/1999 | Prywes | |
| 6,048,328 A | 4/2000 | Haller et al. | |
| 6,050,970 A | 4/2000 | Baerveldt | |
| 6,056,269 A | 5/2000 | Johnson et al. | |
| 6,240,962 B1 | 6/2001 | Tai et al. | |
| 6,251,090 B1 | 6/2001 | Avery et al. | |
| 6,261,256 B1 | 7/2001 | Ahmed | |
| 6,443,893 B1 | 9/2002 | Schnakenberg et al. | |
| 6,447,449 B1 | 9/2002 | Fleischman et al. | |
| 6,468,283 B1 | 10/2002 | Richter et al. | |
| 6,533,733 B1 | 3/2003 | Ericson et al. | |
| 6,579,235 B1 | 6/2003 | Abita et al. | |
| 6,589,198 B1 | 7/2003 | Soltanpour et al. | |
| 6,682,500 B2 | 1/2004 | Soltanpour et al. | |
| 6,712,764 B2 | 3/2004 | Jeffries et al. | |
| 6,719,750 B2 | 4/2004 | Varner et al. | |
| 6,726,676 B2 | 4/2004 | Stegmann et al. | |
| 6,749,568 B2 | 6/2004 | Fleischman et al. | |
| 6,939,299 B1 | 9/2005 | Petersen et al. | |
| 6,962,573 B1 | 11/2005 | Wilcox | |
| 6,976,982 B2 | 12/2005 | Santini, Jr. et al. | |
| 7,025,740 B2 | 4/2006 | Ahmed | |
| 7,137,952 B2 | 11/2006 | Leonardi et al. | |
| 7,169,106 B2 | 1/2007 | Fleischman et al. | |
| 7,252,006 B2 | 8/2007 | Tai et al. | |
| 7,304,334 B2 | 12/2007 | Agarwal et al. | |
| 7,354,416 B2 | 4/2008 | Quiroz-Mercado et al. | |
| 7,409,863 B2 | 8/2008 | Bateman et al. | |
| 7,544,176 B2 | 6/2009 | Rodgers et al. | |
| 7,565,744 B2 * | 7/2009 | Matsui et al. | 29/890.131 |
| 7,612,328 B2 | 11/2009 | Kaiser | |
| 7,648,465 B2 | 1/2010 | Gordon | |
| 7,756,559 B2 | 7/2010 | Abreu | |
| 7,824,699 B2 | 11/2010 | Ralph et al. | |
| 8,123,687 B2 | 2/2012 | Dacquay et al. | |
| 8,182,435 B2 | 5/2012 | Dacquay et al. | |
| 8,206,440 B2 | 6/2012 | Guarnieri | |
| 8,256,465 B2 * | 9/2012 | Christenson et al. | 137/859 |
| 8,257,295 B2 | 9/2012 | Rickard et al. | |
| 8,419,673 B2 | 4/2013 | Rickard | |
| 8,545,431 B2 | 10/2013 | Rickard | |
| 8,549,925 B2 | 10/2013 | Tai et al. | |
| 8,579,848 B2 | 11/2013 | Field et al. | |
| 8,584,703 B2 * | 11/2013 | Kobrin et al. | 137/597 |
| 8,585,631 B2 | 11/2013 | Dacquay | |
| 8,585,664 B2 | 11/2013 | Dos Santos et al. | |
| 8,603,024 B2 | 12/2013 | Bohm et al. | |
| 8,652,085 B2 | 2/2014 | Gelvin et al. | |
| 8,721,580 B2 | 5/2014 | Rickard et al. | |
| 8,753,305 B2 | 6/2014 | Field et al. | |
| 8,814,820 B2 | 8/2014 | Bergheim et al. | |
| 8,840,578 B2 | 9/2014 | Dos Santos et al. | |
| 8,858,491 B2 | 10/2014 | Field et al. | |
| 8,864,701 B2 | 10/2014 | Dos Santos et al. | |
| 8,986,240 B2 | 3/2015 | Dos Santos et al. | |
| 9,072,588 B2 | 7/2015 | Bohm et al. | |
| 9,125,721 B2 | 9/2015 | Field | |
| 9,132,034 B2 | 9/2015 | Dos Santos | |
| 2001/0000527 A1 | 4/2001 | Yaron et al. | |
| 2002/0013545 A1 | 1/2002 | Soltanpour et al. | |
| 2002/0013546 A1 | 1/2002 | Grieshaber et al. | |
| 2002/0019607 A1 | 2/2002 | Bui | |
| 2002/0049374 A1 | 4/2002 | Abreu | |
| 2002/0087111 A1 | 7/2002 | Ethier et al. | |
| 2002/0099359 A1 | 7/2002 | Santini, Jr. et al. | |
| 2002/0103412 A1 | 8/2002 | Trimmer | |
| 2002/0139947 A1 | 10/2002 | Wang | |
| 2002/0143284 A1 | 10/2002 | Tu et al. | |
| 2002/0156413 A1 | 10/2002 | Williams et al. | |
| 2002/0156461 A1 | 10/2002 | Joshi | |
| 2002/0165478 A1 | 11/2002 | Gharib et al. | |
| 2002/0169468 A1 | 11/2002 | Brown | |
| 2002/0175191 A1 | 11/2002 | Joshi et al. | |
| 2002/0193674 A1 | 12/2002 | Fleischman et al. | |
| 2003/0014036 A1 | 1/2003 | Varner et al. | |
| 2003/0078487 A1 | 4/2003 | Jeffries et al. | |
| 2003/0225318 A1 | 12/2003 | Montegrande et al. | |
| 2003/0234376 A1 | 12/2003 | Cabuz et al. | |
| 2004/0013702 A1 | 1/2004 | Glover | |
| 2004/0059248 A1 | 3/2004 | Messner et al. | |
| 2004/0073137 A1 | 4/2004 | Lloyd et al. | |
| 2004/0073156 A1 | 4/2004 | Brown | |
| 2004/0111050 A1 | 6/2004 | Smedley et al. | |
| 2004/0116794 A1 | 6/2004 | Fink et al. | |
| 2004/0186367 A1 | 9/2004 | Fresco | |
| 2004/0228734 A1 | 11/2004 | Jeon et al. | |
| 2004/0254438 A1 | 12/2004 | Chuck et al. | |
| 2004/0254517 A1 | 12/2004 | Quiroz-Mercado et al. | |
| 2005/0016866 A1 | 1/2005 | Kramer et al. | |
| 2005/0049578 A1 | 3/2005 | Tu et al. | |
| 2005/0067029 A1 | 3/2005 | Henning et al. | |
| 2005/0159660 A1 | 7/2005 | Montegrande et al. | |
| 2005/0271704 A1 | 12/2005 | Tu et al. | |
| 2005/0273033 A1 | 12/2005 | Grahn et al. | |
| 2006/0041220 A1 | 2/2006 | Boukhny et al. | |
| 2006/0131350 A1 | 6/2006 | Schechter et al. | |
| 2006/0189916 A1 | 8/2006 | Bas | |
| 2007/0019156 A1 | 1/2007 | Fink | |
| 2007/0032757 A1 | 2/2007 | Medow et al. | |
| 2007/0077270 A1 | 4/2007 | Wen | |
| 2007/0106199 A1 | 5/2007 | Krivoy et al. | |
| 2007/0106200 A1 | 5/2007 | Levy | |
| 2007/0109117 A1 | 5/2007 | Heitzmann et al. | |
| 2007/0123767 A1 | 5/2007 | Montegrande et al. | |
| 2007/0129623 A1 | 6/2007 | Fleischman et al. | |
| 2007/0156079 A1 | 7/2007 | Brown | |
| 2007/0212397 A1 | 9/2007 | Roth | |
| 2007/0243111 A1 | 10/2007 | Momose | |
| 2007/0255262 A1 | 11/2007 | Haase | |
| 2008/0015421 A1 | 1/2008 | Penner | |
| 2008/0027478 A1 | 1/2008 | Connors et al. | |
| 2008/0035875 A1 * | 2/2008 | Tai | F16K 99/0005 251/318 |
| 2008/0077127 A1 | 3/2008 | Gao et al. | |
| 2008/0097276 A1 | 4/2008 | Bertrand et al. | |
| 2008/0125691 A1 | 5/2008 | Yaron et al. | |
| 2008/0129486 A1 | 6/2008 | Jeckelmann et al. | |
| 2008/0147021 A1 | 6/2008 | Jani | |
| 2008/0228127 A1 | 9/2008 | Burns et al. | |
| 2008/0257915 A1 | 10/2008 | Wold | |
| 2009/0069648 A1 | 3/2009 | Irazoqui et al. | |
| 2009/0076367 A1 | 3/2009 | Sit et al. | |
| 2009/0143713 A1 | 6/2009 | Van Dam et al. | |
| 2009/0196903 A1 | 8/2009 | Kliman | |
| 2009/0227933 A1 | 9/2009 | Karageozian | |
| 2009/0240215 A1 | 9/2009 | Humayun et al. | |
| 2009/0275924 A1 | 11/2009 | Lattanzio et al. | |
| 2009/0312742 A1 | 12/2009 | Pang et al. | |
| 2010/0010416 A1 | 1/2010 | Juan, Jr. et al. | |
| 2010/0042209 A1 | 2/2010 | Guarnieri | |
| 2010/0114006 A1 | 5/2010 | Baerveldt | |
| 2010/0121248 A1 | 5/2010 | Yu et al. | |
| 2010/0121348 A1 | 5/2010 | van der Burg et al. | |

(56) References Cited

U.S. PATENT DOCUMENTS

| | | |
|---|---|---|
| 2010/0174272 A1 | 7/2010 | Weiner |
| 2010/0222769 A1 | 9/2010 | Meng et al. |
| 2010/0222770 A1 | 9/2010 | Gordon et al. |
| 2010/0234717 A1 | 9/2010 | Wismer |
| 2010/0249691 A1 | 9/2010 | Van Der Mooren et al. |
| 2010/0253167 A1 | 10/2010 | Charnley et al. |
| 2010/0280349 A1 | 11/2010 | Dacquay et al. |
| 2010/0305550 A1 | 12/2010 | Meng et al. |
| 2011/0046536 A1 | 2/2011 | Stegmann et al. |
| 2011/0071454 A1 | 3/2011 | Dos Santos et al. |
| 2011/0071456 A1 | 3/2011 | Rickard |
| 2011/0071458 A1 | 3/2011 | Rickard |
| 2011/0071459 A1 | 3/2011 | Rickard et al. |
| 2011/0071505 A1 | 3/2011 | Rickard et al. |
| 2011/0077626 A1 | 3/2011 | Baerveldt et al. |
| 2011/0082385 A1 | 4/2011 | Diaz et al. |
| 2011/0144617 A1 | 6/2011 | Meng et al. |
| 2011/0203700 A1 | 8/2011 | Scholten et al. |
| 2011/0248671 A1 | 10/2011 | Dos Santos et al. |
| 2011/0282328 A1 | 11/2011 | Ambati et al. |
| 2012/0004528 A1 | 1/2012 | Li et al. |
| 2012/0022505 A1 | 1/2012 | Dacquay et al. |
| 2012/0022506 A1 | 1/2012 | Rickard et al. |
| 2012/0039770 A1 | 2/2012 | Namkoong et al. |
| 2012/0296258 A1 | 11/2012 | Rickard et al. |
| 2012/0302861 A1 | 11/2012 | Marshall et al. |
| 2012/0316492 A1 | 12/2012 | Chappel |
| 2013/0000765 A1 | 1/2013 | Fernandes et al. |
| 2013/0085440 A1 | 4/2013 | Bohm et al. |
| 2013/0144202 A1 | 6/2013 | Field et al. |
| 2013/0150774 A1 | 6/2013 | Field et al. |
| 2013/0150775 A1 | 6/2013 | Dos Santos et al. |
| 2013/0150777 A1 | 6/2013 | Bohm et al. |
| 2013/0150778 A1 | 6/2013 | Dos Santos |
| 2013/0158381 A1 | 6/2013 | Rickard |
| 2013/0204177 A1 | 8/2013 | Field et al. |
| 2013/0211311 A1 | 8/2013 | Field |
| 2013/0211312 A1 | 8/2013 | Gelvin |
| 2013/0218064 A1 | 8/2013 | Rickard |
| 2013/0317413 A1 | 11/2013 | Field et al. |
| 2013/0338564 A1 | 12/2013 | Rickard et al. |
| 2014/0039374 A1 | 2/2014 | Dos Santos et al. |
| 2014/0107557 A1 | 4/2014 | Dos Santos et al. |
| 2014/0163448 A1 | 6/2014 | Lind et al. |
| 2014/0166140 A1 | 6/2014 | Santos et al. |
| 2014/0171777 A1 | 6/2014 | Sanchez et al. |
| 2014/0172090 A1 | 6/2014 | Gunn |
| 2015/0057523 A1 | 2/2015 | Gunn |
| 2015/0057592 A1 | 2/2015 | Gunn |
| 2015/0057593 A1 | 2/2015 | Johnson et al. |
| 2015/0057595 A1 | 2/2015 | Gunn et al. |
| 2015/0057596 A1 | 2/2015 | Lind et al. |
| 2015/0150720 A1 | 6/2015 | Gunn et al. |
| 2015/0230982 A1 | 8/2015 | Gunn et al. |
| 2015/0230984 A1 | 8/2015 | Gunn |

FOREIGN PATENT DOCUMENTS

| | | |
|---|---|---|
| DE | 4438201 | 5/1996 |
| EP | 0102747 | 3/1984 |
| EP | 1195523 | 4/2002 |
| EP | 1296067 | 3/2006 |
| EP | 1917987 | 5/2008 |
| JP | 03049775 | 8/1992 |
| JP | 2005535392 | 11/2005 |
| JP | 2007512866 | 5/2007 |
| WO | WO9303665 | 3/1993 |
| WO | WO9803665 | 1/1998 |
| WO | WO9803809 | 1/1998 |
| WO | WO9938470 | 8/1999 |
| WO | WO0174427 | 10/2001 |
| WO | WO0194784 | 12/2001 |
| WO | WO02056758 | 7/2002 |
| WO | WO03001991 | 1/2003 |
| WO | WO03102632 | 12/2003 |
| WO | WO2004014218 | 2/2004 |
| WO | WO2005079204 | 9/2005 |
| WO | WO2005088417 | 9/2005 |
| WO | WO2007127305 | 11/2007 |
| WO | WO2007136993 | 11/2007 |
| WO | WO2008060649 | 5/2008 |
| WO | WO2008061043 | 5/2008 |
| WO | WO2008084350 | 7/2008 |
| WO | WO2008094672 | 8/2008 |
| WO | WO2009010799 | 1/2009 |
| WO | WO2009026499 | 2/2009 |
| WO | WO2009049686 | 4/2009 |
| WO | WO2009081031 | 7/2009 |
| WO | WO2010129446 | 11/2010 |
| WO | WO2010136071 | 12/2010 |
| WO | WO2011034727 | 3/2011 |
| WO | WO2011034738 | 3/2011 |
| WO | WO2011034740 | 3/2011 |
| WO | WO2011034742 | 3/2011 |
| WO | WO2011035218 | 3/2011 |
| WO | WO2012012017 | 1/2012 |
| WO | WO2013052332 | 4/2013 |
| WO | WO2013058943 | 4/2013 |
| WO | WO2013085894 | 6/2013 |
| WO | WO2013085895 | 6/2013 |
| WO | WO2013090006 | 6/2013 |
| WO | WO2013090231 | 6/2013 |
| WO | WO2013123142 | 8/2013 |

OTHER PUBLICATIONS

International Searching Authority, International Search Report, PCT/US2012/66709, Apr. 19, 2013, 4 pages.
International Searching Authority, Written Opinion of the International Searching Authority, PCT/US2012/66709, Apr. 19, 2013, 5 pages.
Byunghoon Bae, Hongseok Kee, Seonho Kim, Yeon Lee, Taeseok Sim, Yongkweon Him and Kyihwan Park; "In Vitro Experiment of the Pressure Regulating Valve for a Glaucoma Impact"; Journal of Micromechanics and Microengineering, 13 (2003); pp. 613-619.
Eggers, T., et al, "Wireless Intra-Ocular Pressure Monitoring System Integrated Into an Artificial Lens," 1st Annual Int'l IEEE-EMBS Special Topic Conference on Microtechnologies in Medicine & Biology, Oct. 12-14, 2000, pp. 466-469, Lyon, France.
Greene, M.E. and Gilman, B.G., "Intraocular Pressure Measurement With Instrumented Contact Lenses," Investigative Ophthalmology & Visual Science (IVOS), Apr. 1974, pp. 299-302, vol. 13, No. 4, IVOS.
Hjortdal, Jesper and Jensen, Peter, "In Vitro Measurement of Corneal Strain, Thickness, and Curvature Using Digital Image Processing," Acta Ophthalmologica Scandinavica, 1995, pp. 5-11, vol. 73, Denmark.
International Searching Authority, International Search Report, PCT/US2010/033329, Jul. 13, 2010, 4 pages.
International Searching Authority, Search Report and Written Opinion of the International Searching Authority, PCT/US2010/033329, Jul. 13, 2010, 8 pages.
International Searching Authority, International Search Report, PCT/US2010/047429, Nov. 1, 2010, 4 pages.
International Searching Authority, Written Opinion of the International Searching Authority, PCT/US2010/047429, Nov. 1, 2010, 7 pages.
International Searching Authority, International Search Report, PCT/US2010/047600, Dec. 14, 2010, 5 pages.
International Searching Authority, Written Opinion of the International Searching Authority, PCT/US2010/047600, Dec. 14, 2010, 7 pages.
International Searching Authority, International Search Report, PCT/US2010/049424, Nov. 26, 2010, 6 pages.
International Searching Authority, Written Opinion of the International Searching Authority, PCT/US2010/049424, Nov. 26, 2010, 8 pages.
International Searching Authority, International Search Report, PCT/US2011/036742, Aug. 17, 2011, 2 pages.

(56) References Cited

OTHER PUBLICATIONS

International Searching Authority, Written Opinion of the International Searching Authority, PCT/US2011/036742, Aug. 17, 2011, 5 pages.
Lam, Andrew K.C. and Douthwaite, William A., "The Effect of an Artificially Intraocular Pressure on the Central Corneal Curvature," Ophthalmic and Physiological Optics, 1997, pp. 18-24, vol. 17, No. 1, Elsevier Science, Ltd., Great Britain.
Leonardi, Matteo, et al., "A Soft Contact Lens With a Mems Strain Gage Embedded for Intraocular Pressure Monitoring," In Proc. 12th Int'l Conference on Solid State Sensors, Actuators and Microsystems, Jun. 8-12, 2003, pp. 1043-1046, Vol. 2, Boston, MA.
Leonardi, Matteo, et al., "First Steps Toward Noninvasive Intraocular Pressure Monitoring with a Sensing Contact Lens," Investigative Ophthalmology & Visual Science (IVOS), 2004, pp. 3113-3117, vol. 45, No. 9, IVOS.
McLaren, Jay W., et al, "Continuous Measurement of Intraocular Pressure in Rabbits by Telemetry," Investigative Ophthalmology & Visual Science (IVOS), May 1996, pp. 966-975, vol. 37, No. 6, IVOS.
Puers, Robert, "Linking Sensors with Telemetry: Impact on the System Design," In Proc. 8th Int'l Conference of Solid State Sensors, Actuators, Eurosens, Jun. 25-29, 1995, pp. 169-174, Stockholm, Sweden.
Schnakenberg, U., et al, "Initial Investigations on Systems for Measuring Intraocular Pressure," Sensors and Actuators, 2000, p. 287-291, vol. 85, Elsevier Science B.V., Germany.
Stangel, Karsten, et al, "A Programmable Intraocular CMOS Pressure Sensor System Implant," IEEE Journal of Solid-State Circuits, Jul. 2001, pp. 1094-1100, vol. 36, No. 7, IEEE, Germany.
Ullerich, Stella, et al, "Micro Coils for an Advanced System for Measuring Intraocular Pressure," 1st Annual Int'l IEEE-EMBS Special Topic Conference on Microtechnologies in Medicine & Biology, Oct. 12-14, 2000, pp. 470-474, Lyon, France.
Van Schuylenbergh, K., et al, "An Implantable Telemetric Tonometer for Direct Intraocular Pressure Measurements," 1st European Conference on Biomedical Engineering, Feb. 1991, pp. 194-195, vol. 17, No. 20, Nice, France.
Walter, Peter; Intraocular Pressure Sensor: Where Are We—Where Will We Go? Journal Graefe's Archive for Clinical and Experimental Ophthalmology; Publisher Springer Berline/Heidelberg; ISSN 0721-832X (Print) 1435-702X (Online); Issue vol. 240, No. 5/May 2002 DOI 10.1007/s00417-002-0474-y; pp. 335-336; Subject Collection Medicine.
Neagu Cristina R.; "A Medical Microactuator Based on an Electrochemical Principle"; Thesis at the Twente University,the Netherlands, Enschede; Aug. 28, 1998; pp. 1-162.
Saloomeh Saati M.D., et al.; "Mini Drug Pump for Ophthalmic Use"; TRANS Am Ophthalmol Soc 2009; 107; pp. 60-71.
Stemme et al.; "A Valveless Diffuser/Nozzle-Based Fluid Pump"; ScienceDirect; Sensors and Actuators A, 39; pp. 159-167 (1993).
Nisar, et al.; MEMS-Based Micropumps in Drug Delivery and Biomedical Applications; ScienceDirect; Sensors and Actuators B 130; pp. 917-942 (2008).
International Searching Authority, International Search Report, PCT US2010/047605; Dec. 16, 2010, 7 pages.
International Searching Authority, Written Opinion of the International Searching Authority, PCT US2010/047605; Dec. 16, 2010, 9 pages.
International Searching Authority, International Search Report, PCT/US2010/047612; Dec. 21, 2010, 7 pages.
Internationl Searching Authority, Written Opinion of the International Searching Authority, PCT/US2010/047612; Dec. 21, 2010, 10 pages.
Driot et al.; "Ocular pharmacokinetics of fluocinolone acetonide after RetisertTM intravitreal implantation mplantation in rabbits over a 1-year period"; J. Ocular Pharm; 20; 3;pp. 269-275.

Kuppermann B D et al., 2006, "Efficacy and safety of a novel intravitreous dexamethasone drug-delivery system after applicator or incisional placement in patients with macular edema", IOVS, 47 ARVO E-Abs 5913.
Miyamoto H et al., 1997, Biodegradable scleral implant for intravitreal controlled release of fluconazole, Curr Eye Res, 16(9), 930-935.
Mruthyunjaya P et al., 2003, "An intravitreal sustained release fluocinolone acetonide device to treat severe experimental uveitis", IOVS, 44, ARVO E-Abs 4215.
Ratanapakorn T et al., 2005, "Helical intravitreal triamcinolone implant: An explanation survival study", IVOS 46 E-Abs 484.
Rego MGR et al., 2004, "In vitro evaluation of sustained-release intravitreal dexamethasone implants", IOVS, 45 E-Abs 5060.
Sakurai E et al., 2001, "Scleral plug of biodegradable polymers containing ganciclovir for experimental cytomegalovirus retinitis", IOVS, 42(9), 2043-2048.
See R F et al., 2006, "Safety and drug release profile of injectable intravitreal sustained-release fluocinolone acetonide device", IOVS, 47, ARVO E-Abs 5119.
Tano R et al., 2005, Helical intravitreal implant: surgical method development and outcomes, IOVS, 46, ARVO E-Abs 483.
Varner S E et al., 2003, "Development of a minimally invasive intravitreal implant for drug delivery", IOVS, 44, ARVO E-Abs 4214.
Weiner A L, 2007, "Drug Delivery Systems in Ophthalmic Applications, In: Ocular Therapeutics; Eye on New Discoveries; T. Yorio, A. Clark, M.Wax, Eds, Elsevier Press/Academic Press, New York", pp. 7-43.
Yasukawa T et al., 2001, "Biodegradable scleral plugs for vitreoretinal drug delivery", Adv. Drug Del Rev., 52(1), 25-36.
International Searching Authority, International Search Report, PCT/US2013/026066, Apr. 17, 2013, 5 pages.
International Searching Authority, Written Opinion of the International Searching Authority, PCT/US2013/026066, Apr. 17, 2013, 8 pages.
Parkhutik, Vitali, et al., The Role of Hydrogen in the Formation of Porous Structures in Silicon, Materials Science & Engineering, 1999, B58, 95-99, Elsevier Science, S.A.
Dacquay, Bruno, Intraocular Pressure Sensor, Prosecution History, U.S. Appl. No. 12/434,709, filed May 4, 2009, 566 pages.
Rickard, Matthew J.A., Lumen Clearing Valve for Glaucoma Drainage Device, Prosecution History, U.S. Appl. No. 12/609,043, filed Oct. 30, 2009, 1507 pages.
Rickard, Matthew, Intraocular Pressure Sensor with External Pressure Compensation, Prosecution History, U.S. Appl. No. 12/563,244, filed Sep. 21, 2009, 562 pages.
Dos Santos, Cesario, Power Generator for Glaucoma Drainage Device, Prosecution History, U.S. Appl. No. 12/685,772, filed Jan. 12, 2010, 517 pages.
Dacquay, Bruno, Closed Loop Glaucoma Drug Delivery System, Prosecution History, U.S. Appl. No. 13/109,155, filed May 17, 2011, 238 pages.
Field, Leslie, Active Drainage Systems with Pressure-Driven Valves and Electronically-Driven Pump, Prosecution History, U.S. Appl. No. 13/315,329, filed Dec. 9, 2011, 1620 pages.
Rickard, Matthew J.A., Power Saving Glaucoma Drainage Device, Prosecution History, U.S. Appl. No. 12/837,803, filed Jul. 16, 2010, 1725 pages.
Dos Santos, Cecario P., Multilayer Membrane Actuators, Prosecution History, U.S. Appl. No. 13/315,905, filed Dec. 9, 2011, 1652 pages.
Rickard, Matthew, Intraocular Pressure Sensor with External Pressure Compensation, Prosecution History,U.S. Appl. No. 14/267,443, filed May 1, 2014, 53 pages.
Rickard, Matthew, Intraocular Pressure Sensor with External Pressure Compensation, Prosecution History, U.S. Appl. No. 13/565,907, filed Aug. 3, 2012, 1652 pages.
Barton, Keith, et al., "The Ahmed Baerveldt Comparison Study," Journal of Ophthalmology, Jul. 15, 2010, vol. 118, No. 3, Elsevier, Inc., USA.

(56) References Cited

OTHER PUBLICATIONS

International Searching Authority, Search Report of the International Searching Authority, PCT/US2012/057261, Jan. 23, 2013, 7 pages.
International Searching Authority, Written Opinion of the International Searching Authority, PCT/US2012/057261, Jan. 23, 2013, 8 pages.
International Searching Authority, International Search Report, PCT/US2014/039582, Oct. 22, 2014, 3 pages.
International Searching Authority, Written Opinion, PCT/US2014/039582, Oct. 22, 2014, 3 pages.
Mokwa et al., "Mircro-Transponder Systems for Medical Applications", IEEE Transactions on Instrumentation and Measurement, vol. 50, No. 6, Dec. 2001, 5 pgs.

* cited by examiner

MEMS CHECK VALVE

PRIORITY CLAIM

This application claims the benefit of priority of U.S. Provisional Patent Application Ser. No. 61/737,964 titled "MEMS CHECK VALVE," filed on Dec. 17, 2012, whose inventors are Cesario Pereira Dos Santos and Leslie A. Field, which is hereby incorporated by reference in its entirety as though fully and completely set forth herein.

BACKGROUND

The present disclosure relates generally to a MEMS (Micro Electro-Mechanical Systems) check valve and associated systems and methods, and more particularly, to a MEMS check valve usable in a pump platform. The pump platform may be used in ophthalmic treatments.

Glaucoma, a group of eye diseases affecting the retina and optic nerve, is one of the leading causes of blindness worldwide. Most forms of glaucoma result when the intraocular pressure (IOP) increases to pressures above normal for prolonged periods of time. IOP can increase due to high resistance to the drainage of the aqueous humor relative to its production. Left untreated, an elevated IOP causes irreversible damage to the optic nerve and retinal fibers resulting in a progressive, permanent loss of vision.

The eye's ciliary body continuously produces aqueous humor, the clear fluid that fills the anterior segment of the eye (the space between the cornea and lens). The aqueous humor flows out of the anterior chamber (the space between the cornea and iris) through the trabecular meshwork and the uveoscleral pathways, both of which contribute to the aqueous humor drainage system. The delicate balance between the production and drainage of aqueous humor determines the eye's IOP.

FIG. 1 is a diagram of the front portion of an eye that helps to explain the processes of glaucoma. In FIG. 1, representations of the lens 10, cornea 20, iris 30, ciliary body 40, trabecular meshwork 50, Schlemm's canal 60, and anterior chamber 70 are pictured. Anatomically, the anterior segment of the eye includes the structures that cause elevated IOP which may lead to glaucoma. Aqueous humor fluid is produced by the ciliary body 40 which lies beneath the iris 30 and adjacent to the lens 10 in the anterior segment of the eye. This aqueous humor washes over the lens 10 and iris 30 and flows to the drainage system located in the angle of the anterior chamber 70. The angle of the anterior chamber 70, which extends circumferentially around the eye, contains structures that allow the aqueous humor to drain. The trabecular meshwork 50 is commonly implicated in glaucoma. The trabecular meshwork 50 extends circumferentially around the anterior chamber 70. The trabecular meshwork 50 seems to act as a filter, limiting the outflow of aqueous humor and providing a back pressure that directly relates to IOP. Schlemm's canal 60 is located beyond the trabecular meshwork 50. Schlemm's canal 60 is fluidically coupled to collector channels (not shown) allowing aqueous humor to flow out of the anterior chamber 70. The two arrows in the anterior segment of FIG. 1 show the flow of aqueous humor from the ciliary bodies 40, over the lens 10, over the iris 30, through the trabecular meshwork 50, and into Schlemm's canal 60 and its collector channels.

One method of treating glaucoma includes implanting a drainage device in a patient's eye. The drainage device allows fluid to flow from the interior chamber of the eye to a drainage site, relieving pressure in the eye and thus lowering IOP. In order to provide desired treatments to patients, it may be important to regulate the drainage flow through the drainage device. However, drainage devices with flow regulation devices can be large and unwieldy when implanted in the eye. Such devices may not provide desired levels of comfort to the patient and may result in tissue irritation or other discomforts. In addition, implantation of larger implants can be challenging to secure.

The system and methods disclosed herein overcome one or more of the deficiencies of the prior art.

SUMMARY

In one exemplary aspect, the present disclosure is directed to a MEMS check valve including a supporting portion having a first perforation therethrough sized to permit fluid flow and a displaceable portion having a second perforation therethrough sized to permit fluid flow. The displaceable portion may be moveable relative to the supporting portion between a closed position inhibiting fluid flow through the valve and an open position permitting fluid flow through the valve. The first and second perforations are offset to inhibit fluid flow when the displaceable portion is in the first position, and fluid may flow through the first and second perforations when the displaceable portion is in the second position.

In one aspect, the supporting portion includes a body portion, and the displaceable portion abuts the supporting portion such that the second perforation is aligned with the body portion when the displaceable portion is in the closed position.

In another exemplary aspect, the present disclosure is directed to a MEMS check valve chip including a first side and an opposing second side. A first passage extends from the first side to the second side, and a second passage extends from the first side to the second side. A first fluid restriction on the first side may be associated with the first passage, with the fluid restriction being configured to inhibit fluid flow into the first passage and permitting fluid flow out of the first passage. A second fluid restriction on the first side may be associated with the second passage. The second fluid restriction may be being configured to inhibit fluid flow out of the second passage and permit fluid flow into the second passage.

In one aspect, the second fluid restriction comprises a MEMS check valve having a supporting portion and a displaceable portion. The displaceable portion may be moveable relative to the supporting portion between a closed position inhibiting fluid flow through the valve and an open position permitting fluid flow through the valve.

In another exemplary aspect, the present disclosure is directed to a method including forming a fluid passageway through a MEMS chip having a first side and a second side, and including creating a displaceable member on the first side of the chip over the passageway. The displaceable member may be having at least one displaceable member perforation therethrough configured to permit the flow of a fluid. The method may also include creating a supporting portion over the displaceable member on the first side of the chip. The supporting portion may have at least one supporting portion perforation therethrough configured to permit the flow of a fluid therethrough. The displaceable member perforation may be aligned with a solid portion of the supporting portion when the displaceable member is in a first position to inhibit fluid flow through the displaceable member perforation, and the displaceable member perforation may be spaced from the solid portion of the supporting portion when the displaceable member is in a second position to permit fluid flow through the displaceable member perforation.

In one aspect, the method includes forming a second fluid passageway through the MEMS chip, and creating a second displaceable member on the first side of the chip over the second fluid passageway. The displaceable member may include at least one displaceable member perforation therethrough configured to permit the flow of a fluid therethrough. In one aspect, the method may include stacking the MEMS chip on a second MEMS chip to form a chamber therebetween.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

The accompanying drawings illustrate embodiments of the devices and methods disclosed herein and together with the description, serve to explain the principles of the present disclosure.

DETAILED DESCRIPTION

Figure 1:
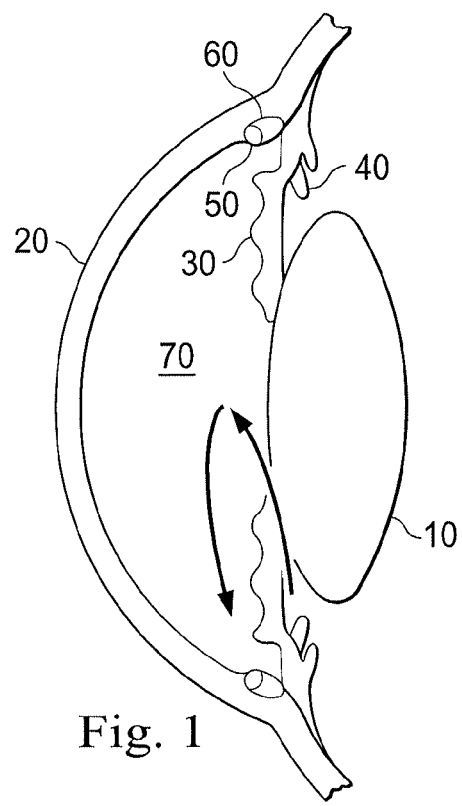
FIG. 1 is a diagram of the front portion of an eye.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For simplicity, in some instances the same reference numbers are used throughout the drawings to refer to the same or like parts.

The present disclosure relates generally to a MEMS check valve that may be formed on a chip to regulate fluid flow through a flow passage. The MEMS check valve may be formed on the side of the chip into which the fluid enters the passage. Because of its arrangement, the check valve disclosed herein may be formed on the same side of a chip as a second check valve, and the two check valves may restrict fluid flow in opposite directions. Accordingly, when used in a MEMS pump, fluid may flow through the first check valve formed on the first side of the chip into a chamber and may be restricted from exiting the chamber through the first check valve, but may be permitted to exit the chamber through the second check valve formed on the first side of the chip. Because the MEMS check valve may be formed at the entrance to the flow passage through the chip on the first side of the chip, chip processing may be easier and may be less expensive. In addition, since the entrance valve and the exit valve are able to be formed on the same side of the chip, the overall stack size of the pump may be reduced because fewer chips are needed when compared to a device that uses one check valve per chip. Thus, implants formed from the chips may be smaller making them more comfortable for the patient, potentially easier to implant, improving the overall clinical result. In addition because fewer chips are required, the resulting devices may be less expensive to manufacture.

Figure 2:
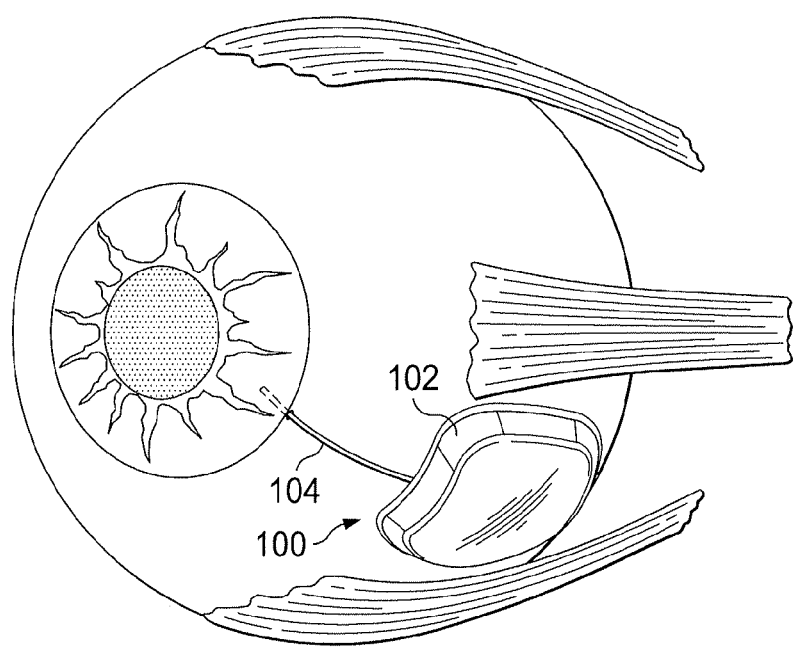
FIG. 2 is an illustration of an exemplary flow-regulating system disposed in the eye in accordance with one embodiment of the present disclosure.

FIG. 2 shows an exemplary implantable system 100 disposed on an eye to treat an ocular condition according to one exemplary aspect of the present disclosure. The implantable system 100 includes a body referred to herein as a plate 102 and a drainage tube 104 that extends from the plate 102. The plate 102 is arranged to carry various components of an IOP control system, and may include a valve, pump, transducers or sensors, a processing system and memory, drug delivery components, a power source or other components that may be used to either control the implantable system 100 or otherwise treat ocular conditions.

The plate 102 is configured to fit at least partially within the subconjunctival space and is sized for example within a range between about 15 mm×12 mm to about 30 mm×15 mm and has a thickness less than about 2 mm thick and preferably less than about 1 mm thick. The plate 102 may be formed to the radius of the eye globe (about 0.5 inches). In some embodiments, the plate 102 is rigid and preformed with a curvature suitable to substantially conform to the globe or it may be flexible to conform to the globe. Some embodiments have relatively planar outer surfaces. Some of these are small enough that conforming to the globe provides little benefit in comfort or implantation technique. The above dimensions are exemplary only, and other sizes and arrangements are contemplated. When implanted, the plate 102 may be located in the subconjunctival pocket between the conjunctiva and sclera. It may be generally located on an ocular quadrant commonly used for conventional glaucoma drainage devices with plates; that is, it may be centered such that it is equidistant from the neighboring ocular muscles that define the ocular quadrant chosen for implantation.

The drainage tube 104 is sized to bridge the anterior chamber and the plate 102 in the subconjunctival pocket to provide an auxiliary flow path for aqueous humor, bypassing the flow-resistive conventional pathway through the trabecular meshwork and shunting aqueous humor directly to a drainage site. In the example shown, the drainage tube 104 is a single tube having a single lumen. Other embodiments include a plurality of drainage tubes or a plurality of lumens cooperating together to permit fluid to flow through the implantable system 100. The drainage tube 104 is sized to extend from the plate 102 to the anterior chamber of the eye, as shown in FIG. 2. Aqueous humor may drain through the drainage tube from the anterior chamber to and out of the plate 102 to alleviate elevated intraocular pressure conditions.

Figure 3:
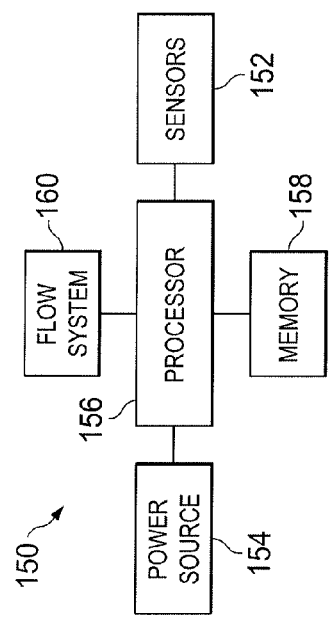
FIG. 3 is a block diagram of an exemplary IOP control system according to the principles of the present disclosure.

FIG. 3 is a block diagram of an exemplary IOP control system 150 forming a part of the implantable system 100. In some embodiments, they may form a part of the plate 102. The IOP control system 150 is configured in a manner that provides IOP pressure control, reducing complications arising from surgical implant glaucoma treatments. In FIG. 3, the IOP control system 150 may include one or more sensors 152, a power source 154, a processor 156, a memory 158, and a flow system 160.

The one or more sensors 152 may be configured to detect a parameter relating to the condition of the patient or the condition of the implantable device 100. In one embodiment, the one or more sensors 152 are pressure sensors disposed about the implantable device 100 and configured to detect pressure or variations in pressure. For example, the sensors may be used to detect pressures for calculation of IOP. Data from the sensors may be communicated to the processor 156 for processing.

The power source 154, which provides power to the system 150, is typically a rechargeable battery, such as a lithium ion or lithium polymer battery, although other types of power sources may be employed such as capacitors. The power source can be recharged or the power source can exist external of the system 150 via inductive coupling such as an RFID (Radio Frequency Identification Device) link or other type of magnetic coupling.

The processor 156 is typically an integrated circuit with power, input, and output pins capable of performing logic functions. In various embodiments, the processor 156 may be a targeted device controller or a microprocessor configured to control more than one component of the device. It may receive and process data and may issue control signals to the flow system or other components.

The memory 158, which is typically a semiconductor memory such as RAM (Random Access Memory), FRAM (Ferroelectric Random Access Memory), or flash memory, interfaces with the processor 156. As such, the processor 156 can write to and read from the memory 158, and perform other common functions associated with managing semiconductor memory. In this manner, a series of IOP readings can be stored in the memory 158.

The flow system 160 controls the amount of drainage flow through the implantable device 100. In one embodiment, it is responsive to signals from the processor 156 to increase flow, decrease flow, or maintain flow.

The flow system 160 may be controlled by the processor 156 based on input data received from, by way of non-limiting example, sensors or data or a programmed treatment plan. A desired pressure differential can be maintained by controlling the operation of the flow system 160. Likewise, various intraocular pressure parameters, such as, by way of non-limiting example, the desired IOP, the IOP change rate, and/or the bleb pressure may be controlled by controlling the operation of flow system 160.

Figure 4:
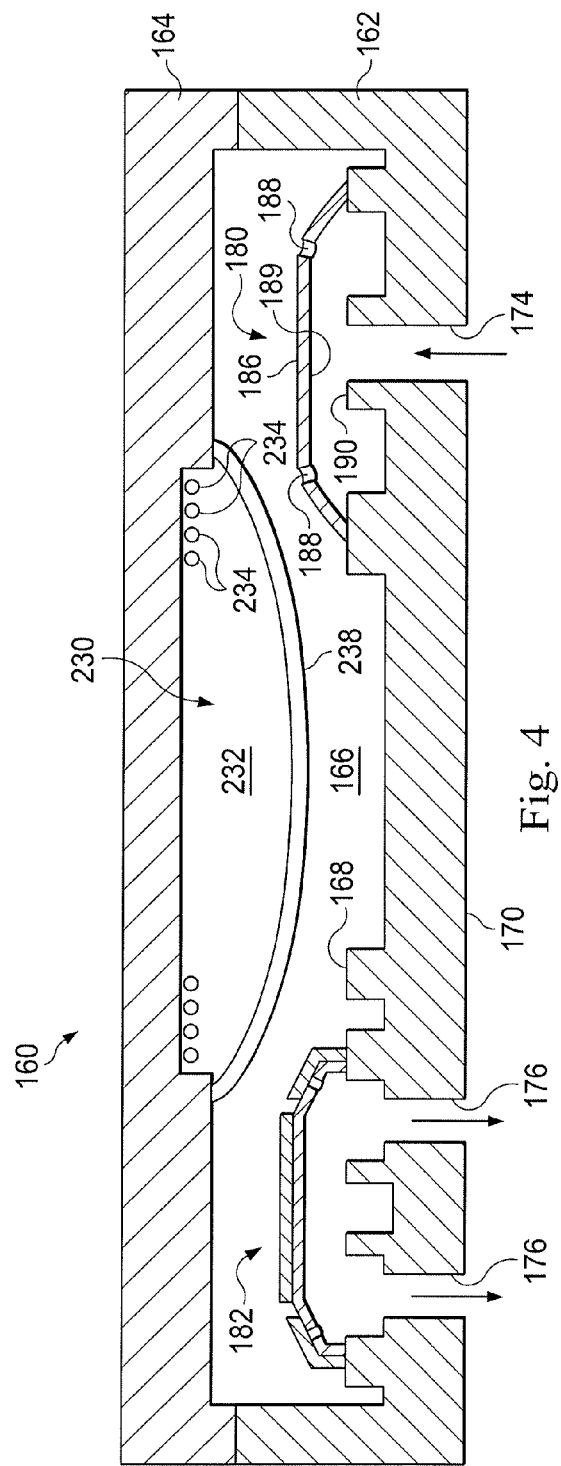
FIG. 4 is stylized illustration of a cross-sectional view of an exemplary flow system that may be a part of an exemplary IOP control system according to the principles of the present disclosure.

FIG. 4 shows a stylized cross-sectional view of an exemplary flow system 160 carried by or forming a part of the plate 102. It includes a valve chip 162 and a stacked pump chip 164 each formed using MEMS technology. Stacked together these form a flow system chamber 166. In this example, the flow system 160 is a pump configured to draw fluid into the chamber 166 through an inlet passageway 174 and expel the fluid from the chamber 166 through an outlet passageway 176.

As can be seen in FIG. 4, the valve chip 162 comprises an upper side 168 facing the chamber 166 and a lower side 170 opposite the upper side. At least one inlet passageway 174 and at least one outlet passageway 176 extends from the upper side 168 to the lower side 170. In the embodiment shown, at least two outlet passageways 176 extend from the upper side 168 to the lower side 170. In some embodiments, the inlet and outlet passageways 174, 176 may be a circular array of passageways through the valve chip 162. The inlet passageway 174 may be in fluid communication with the drainage tube 104 (FIG. 2) and is configured to receive aqueous flowing from the drainage tube 104. The outlet passageway 176 permits fluid to exit the flow system 160 for release at a drainage site or for further regulation via additional flow systems.

The valve chip 162 also includes an inlet check valve 180 and an outlet check valve 182. Here, the inlet and outlet check valves 180 and 182 are formed on the same side of a single chip. Accordingly, even with two check valves arranged to restrict flow in opposite directions, manufacturing processing may be performed on the same side of the same chip. Also, because of the arrangement of the check valves on the same side of the chip, the pump functionality may be formed using only two chips, whereas devices formed with a single check valve on a side of the chip would use at least an additional chip. This may reduce the stack size required to carry out the operation of the flow system 160.

The inlet check valve 180 comprises a flexible portion 186 that spans the opening of the inlet passageway on the upper side 168. The flexible portion 186 may be a membrane formed of an elastically deformable material including without limitation, materials such as a silicone, silicon nitride, silicone elastomer, polyimide, parylene and others. In the example shown, the flexible portion 186 is a circular material secured at its periphery to the chip 162. In other embodiments, the chip 162 and the flexible portion 186 are formed so that the membrane has a non-circular shape, including oval, substantially rectangular, or square, for example. Other shapes are also contemplated.

In the embodiment shown, the flexible portion 186 includes one or more flow apertures 188 and a sealing portion 189. The flow apertures 188, in this embodiment are disposed off-center, and the sealing portion 189 is disposed in a central region. In this embodiment, fluid may flow into the chamber 166 through the inlet passageway 174 and through the flow apertures 188. If pressure in the chamber 166 is greater than the inlet pressure, the flexible portion 186 may deflect so that the sealing portion 189 abuts against a seat 190 and the flexible portion 186 may restrict fluid from exiting the chamber 166 through the inlet passageway 174.

The flow apertures 188 are formed as through holes in the flexible portion 186. In some embodiments, the flow apertures 188 are formed of a mesh or screen material that permits a fluid to flow therethrough. The flow apertures 188 may be of any shape and of any size that permits the fluid to pass into the chamber 166. In some embodiments, the flexible portion 186 includes a solid central portion and the flow apertures, as a screen or porous material forms the entire periphery of the flexible portion 186. Other arrangements are also contemplated.

Figure 5:
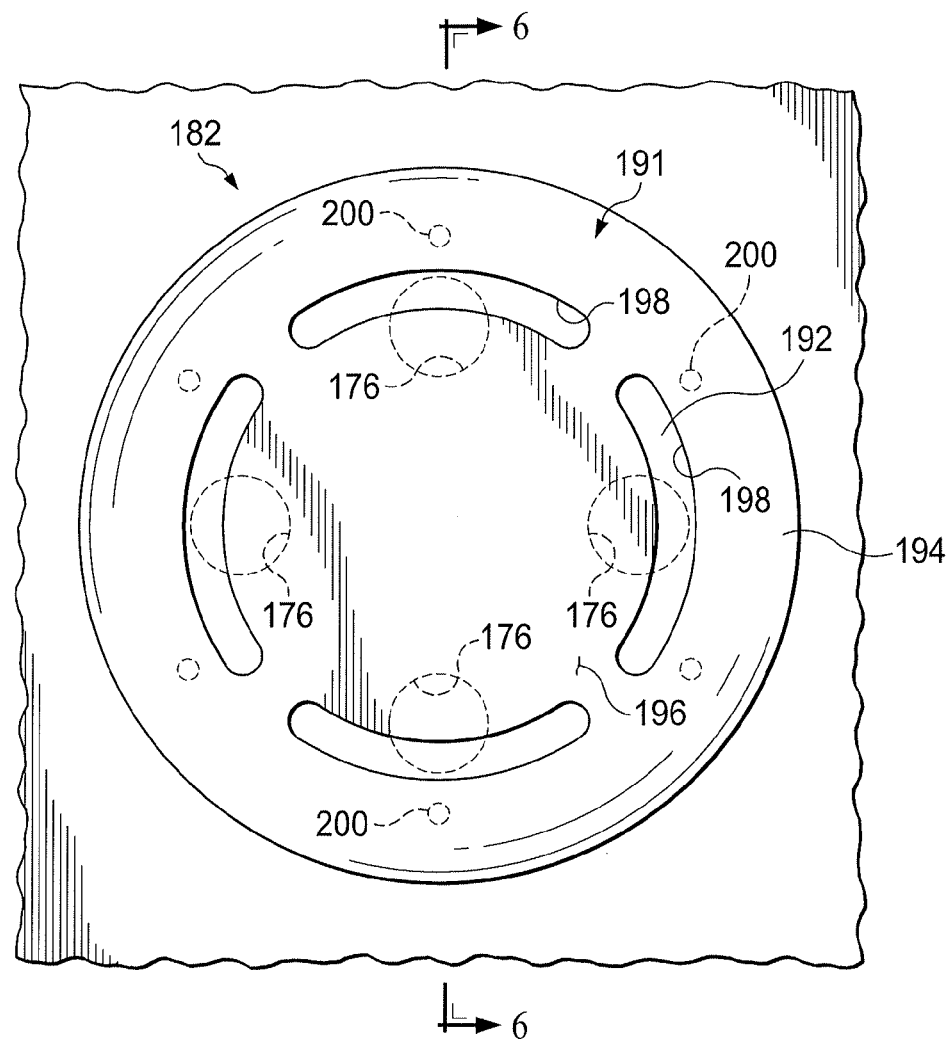
FIG. 5 is a top view of an exemplary MEMS outlet flow valve according to the principles of the present disclosure.
Figure 6:
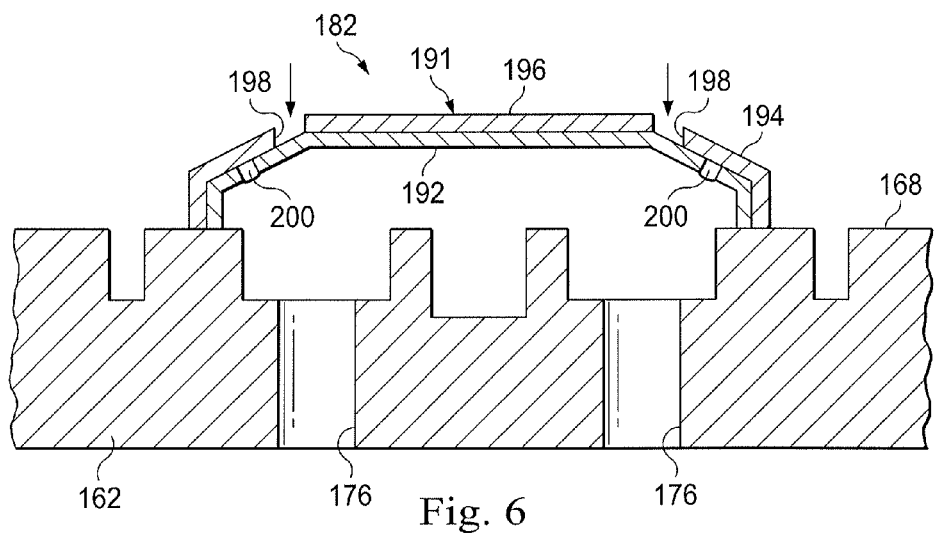
FIG. 6 is an illustration of a cross-sectional view taken along lines 6-6 in FIG. 5 showing the MEMS outlet flow valve in a closed position according to the principles of the present disclosure.
Figure 7:
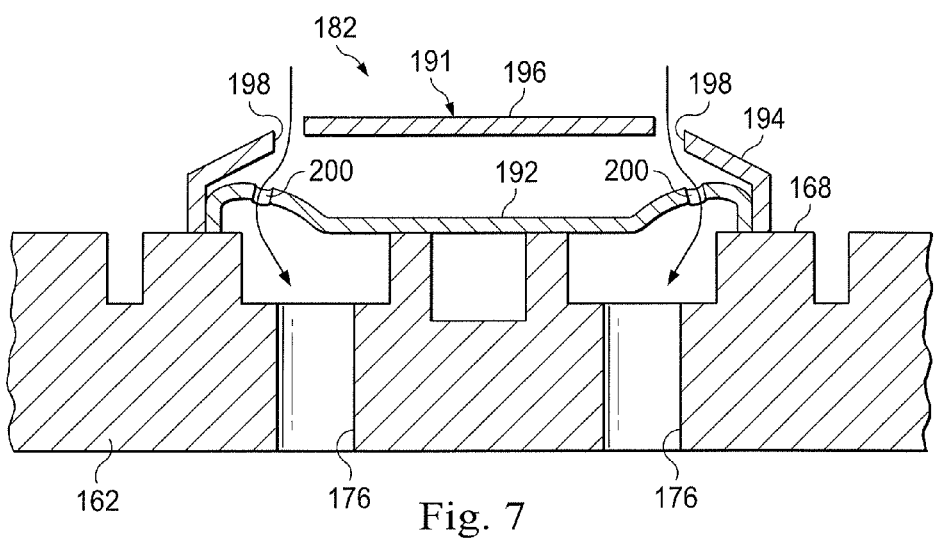
FIG. 7 is an illustration of a cross-sectional view showing the MEMS outlet flow valve of FIG. 6 in an open position according to the principles of the present disclosure.

The outlet check valve 182 will be described with reference to FIGS. 4-7. FIG. 5 shows a top view of the outlet check valve 182. FIG. 6 is a cross-sectional view through lines 6-6 in FIG. 5 showing the outlet check valve 182 in a closed position. FIG. 7 shows the outlet check valve 182 in an open position. The outlet check valve 182 includes an enclosure structure 191, a flexible portion 192. The enclosure structure 191 acts as a rigid supporting structure for the flexible portion 192. The enclosure structure 191 forms a cap over the entrance to the outlet passageway 176 and includes a leg portion 194 and a body portion 196. In the embodiment shown, the leg portions 194 extend upward and away from the upper side 168 of the valve chip 162. The body portion 196 connects to and is supported by the leg portion 194.

In one embodiment, the enclosure structure 191 is formed of flexible media, such as for example, the same material as the flexible membrane portion 186 discussed above. In one embodiment, for example, the enclosure structure 191 may be made of parylene. In other embodiments, the enclosure structure 191 is formed of a rigid material, such as, for example, silicon, gold, titanium, or some other rigid structure material.

The enclosure structure 191 also includes one or more perforations 198 formed therethrough that permit the passage of liquid from the chamber 166 to the outlet passageway 176. In the embodiment shown, the perforations 198 include one or more through holes in a hole pattern located about where the leg portion 194 and the body portion 196 meet. In other embodiments, the perforations 198 may be formed elsewhere on the enclosure structure 191. For example, in some embodiments the perforations 198 are formed in the body structure while in other embodiments, the perforations are formed in the leg structures. In still other embodiments, the perforations are formed through a mesh-like structure or other arrangement that still allows fluid to flow from the chamber 166 to the outlet passageway 176. In addition to having the perforations, as can be understood by the above description, the enclosure structure includes some regions of non-perforations. In the embodiments shown these are found along the leg and body portions 194, 196.

The flexible portion 192 may be similar in some respects to the flexible portion 186 discussed above and the description above applies to the flexible portion 192 also. The flexible portion 192 connects to the upper surface 168 of the valve chip 162 and lies adjacent to the enclosure structure. As can be seen, the flexible portion 192 includes perforations 200 therethrough that are sized and configured to permit fluid flow therethrough. The perforations 200 may be similar to those discussed above with reference to the perforations 188 in FIG. 4.

When the outlet check valve 182 is in the closed position shown in FIG. 6, the flexible portion 192 abuts against the enclosure structure 191 over at least a portion of the flexible portion 192. In this position, the perforations 200 in the flexible portion 192 do not overlap or are misaligned with the perforations 198 in the enclosure structure 191. Accordingly, fluid flow through the check valve 182 is inhibited or prevented when the outlet check valve is in the closed position.

When the outlet check valve 182 is in the open position shown in FIG. 7, at least a portion of the flexible portion 192 is spaced from the enclosure structure 191. In this position, the perforations 200 in the flexible portion 192 are spaced apart from the enclosure structure 191. Fluid may flow through the perforations 198 in the enclosure structure 191, then flow laterally toward the perforations 200 in the flexible portions, through the perforations 200 in the flexible portion 192, and into the outlet passageway 176. Accordingly when the check valve 182 is in the open position, fluid may drain from the chamber 166 to the outlet passageway 176. In the embodiment shown, the flexible portion 192 is biased to the closed position shown in FIG. 6.

In the embodiment shown, fluid may flow out of the chamber 166 through the outlet passageway 176 when the outlet check valve 182 is open. If pressure in the chamber 166 is higher than the pressure in the outlet passageway 176, then the fluid will act on the exposed membrane portion and force the outlet check valve to the open position. In the open position, the fluid may flow from the chamber 166 through the perforations 198 in the enclosure structure 191 and through the perforations 200 in the flexible portion 192 and into the outlet passageway 176. When pressure in the outlet passageway 176 is greater than the pressure in the chamber 166, the flexible portion 192 displaces to the closed position, and the perforations 200 in the flexible portion 192 are blocked by the solid portion of the enclosure structure 191. At the same time, the perforations 198 in the enclosure structure 191 are blocked by the solid portions of the flexible portion 192. As can be seen in FIGS. 4 and 5, the outlet passageway 176 is formed of an array of passages all offset from the central portion of the flexible portion 192, such that an axis through one of the passageways 176 is offset from a central axis of the flexible portion 192.

In the embodiment shown in FIG. 4, the pump chip 164 of the flow system 160 includes an electrolytic actuator usable to create the pumping action in the flow system 160. The electrolytic actuator includes a flow control chamber 230, an electrolyte liquid 232 in the flow control chamber 230, electrodes 234 arranged to cooperate with the electrolyte liquid 232, and a flexible membrane 238. In operation, voltage applied across the electrodes 234 causes the phase change through electrolysis of a portion of the electrolyte liquid to generate gas bubbles in the electrolyte liquid 232, increasing the pressure within the flow control chamber 230. As the pressure increases, the flexible membrane 238 deflects into the chamber 166, increasing the pressure in the chamber 166. As the pressure in chamber 166 increases, any fluid in the chamber 166 is restricted from moving though the inlet passageway by the inlet passageway check valve 180, which moves into the closed position due to the increase pressure in chamber 166. The fluid in the chamber transits through the outlet check valve 182 due to the pressure increase in chamber 166, which acts on the valve to move it into the open position and create a continuous flow path through the perforations 198, 200. In a similar manner, as the gas in the flow control chamber 230 returns to its liquid state, the volume in the flow control chamber 230 decreases, causing the flexible membrane 238 to move further out of the chamber 166. This causes the pressure in chamber 166 to decrease and the outlet check valve 182 moves into to the closed position and the inlet check valve 180 moves into the open position. Fluid in the inlet passageway 174 is then able to pass through inlet check valve 180 and into the chamber 166. The described process is repeated cyclically to move fluid through the system in a pumping manner.

In another example, instead of having the electrolysis actuator disposed on the pump chip, the electrolysis actuator is disposed on the upper surface 168 of the valve chip 162. Accordingly, in this embodiment, all the displaceable members and/or membranes are formed on the same chip reducing the quantity of chips with flexible material processes.

A method of manufacturing the MEMS outlet check valve 182 includes forming a passageway through the chip for the passage of a fluid. The passageway may extend from an upper side 168 to a lower side 170. The flexible portion 192 may include at least one perforation 200 therethrough. In addition, the flexible portion 192 may include at least one solid region that does not readily permit flow therethrough under normal operating conditions.

The enclosure structure 191 may then be formed over the flexible portion 192. Perforations 198 in the enclosure structure 191 may be formed in locations on the enclosure structure that are offset or not aligned with perforations 200 in the flexible portion 192 when the valve is in a closed position.

In some embodiments, a MEMS inlet check valve 180 is formed on the same side of the chip as the MEMS outlet check valve 182. The inlet check valve 180 may be formed in manner similar to that described above, with an inlet passageway 174 formed through the chip and a flexible portion 186 formed over the entrance to the passageway 174. The flexible portion 186 may have perforations allowing fluid flow therethrough. Under pressure, the flexible portion 186 is configured to displace and seat on the seat 190 and prevent fluid flow out of the inlet chamber 166.

The outlet check valve disclosed herein creates new opportunities for creating flow systems, such as a fluid valve or a pump system, in a smaller and/or thinner package. The unique design of the MEMS outlet check valve allows the MEMS outlet check valve to be formed on the same side of a chip as the inlet valve. Accordingly, an entire chip layer may be eliminated from the flow system, resulting in a shorter stack of chips for the flow system. This may result in a thinner plate that may be more comfortable for the patient. In addition, since complex material deposition processing may occur on a single side of the chip, processing may be simplified and costs may be reduced.

Persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

We claim:

1. A micro electro-mechanical systems (MEMS) check valve, comprising:
   a supporting portion having a first perforation therethrough sized to permit fluid flow; and
   a displaceable portion having a second perforation therethrough sized to permit fluid flow, the displaceable portion being disposed between the supporting portion and a valve seat, the displaceable portion comprising an outer flexible region and being moveable relative to the supporting portion between a closed position inhibiting fluid flow through the check valve and an open position permitting fluid flow through the check valve, wherein the first and second perforations are offset to inhibit fluid flow when the displaceable portion is in the closed position and wherein a fluid flows through the first and second perforations when the displaceable portion is in the open position, and wherein the displaceable portion abuts against the supporting portion when the displaceable portion is in the closed position.

2. The MEMS check valve of claim 1, wherein the supporting portion includes a body portion, and the displaceable portion abuts the supporting portion such that the second perforation is aligned with the body portion when the displaceable portion is in the closed position.

3. The MEMS check valve of claim 1, wherein the displaceable portion is formed of parylene.

4. The MEMS check valve of claim 1, wherein the supporting portion is comprised of parylene.

5. The MEMS check valve of claim 1, wherein the supporting portion is rigid.

6. The MEMS check valve of claim 1, wherein the supporting portion is formed of at least one of silicon, gold, titanium, or other metal.

7. The MEMS check valve of claim 1, comprising a chip having a passageway therethrough, the MEMS check valve being operable to permit one-way fluid flow through the passageway, wherein an axis of the passageway is off-set from a central axis of the displaceable portion.

8. A micro electro-mechanical systems (MEMS) check valve chip, comprising:
   a chip body having a first side and an opposing second side;
   a first passage extending from the first side to the second side of the chip body;
   a second passage extending from the first side to the second side of the chip body;
   a first fluid restriction on the first side associated with the first passage, the fluid restriction being configured to inhibit fluid flow into the first passage and permitting fluid flow out of the first passage; and
   a second fluid restriction on the first side associated with the second passage, the second fluid restriction being configured to inhibit fluid flow out of the second passage and to permit fluid flow into the second passage, the second fluid restriction including a flexible displaceable portion positioned between a rigid supporting portion and the first side of the chip body.

9. The MEMS check valve chip of claim 8, wherein the displaceable portion is moveable relative to the supporting portion between a closed position inhibiting fluid flow through the valve chip and an open position permitting fluid flow through the valve chip.

10. The MEMS check valve chip of claim 9, wherein the supporting portion includes a body portion, and the displaceable portion abuts the supporting portion such that a perforation formed in the displaceable portion is aligned with the body portion when the displaceable portion is in the closed position.

11. The MEMS check valve chip of claim 9, wherein the displaceable portion abuts against the supporting portion when the displaceable portion is in the closed position.

12. The MEMS check valve chip of claim 9, wherein the displaceable portion is formed of parylene.

13. The MEMS check valve chip of claim 9, wherein the supporting portion is comprised of parylene.

14. The MEMS check valve chip of claim 9, wherein the supporting portion is rigid.

15. The MEMS check valve chip of claim 9, wherein the supporting portion is formed of at least one of silicon, gold, titanium, or other metal.

16. The MEMS check valve chip of claim 9, comprising a passageway extending between the first passage and the second passage, the MEMS check valve chip being operable to permit one-way fluid flow through the passageway, wherein an axis of the passageway is off-set from a central axis of the flexible portion.

17. A method comprising:
   forming a fluid passageway through a MEMS chip having a first side and a second side;
   creating a displaceable member on the first side of the chip over the passageway, the displaceable member having at least one displaceable member perforation therethrough configured to permit the flow of a fluid therethrough, the displaceable member further having an outer flexible region; and creating a supporting portion over the displaceable member on the first side of the chip, the supporting portion having at least one supporting portion perforation therethrough configured to permit the flow of the fluid therethrough, wherein the displaceable member perforation is aligned with a solid portion of the supporting portion when the displaceable member is in a first position to inhibit fluid flow through the displaceable member perforation, and wherein the displaceable member perforation is spaced from the solid portion of the supporting portion when the displaceable member is in a second position to permit fluid flow through the displaceable member perforation.

18. The method of claim 17, comprising:

forming a second fluid passageway through the MEMS chip; and creating a second displaceable member on the first side of the chip over the second fluid passageway, the second displaceable member having at least one displaceable member perforation therethrough configured to permit the flow of a fluid therethrough.

19. The method of claim 17, comprising:

securing the displaceable member along its periphery to the MEMS chip; and stacking the MEMS chip on a second MEMS chip to form a chamber therebetween.

\* \* \* \* \*